E. ROSENBERG.
VARIABLE SPEED ELECTRIC MOTOR.
APPLICATION FILED OCT. 9, 1911.
1,222,469.
Patented Apr. 10, 1917.
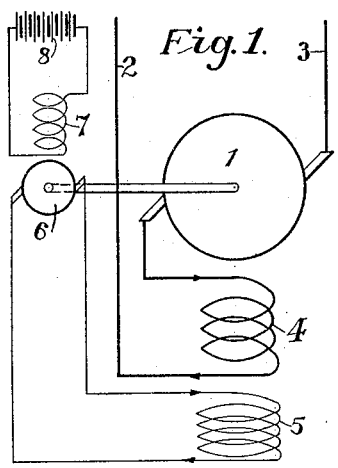
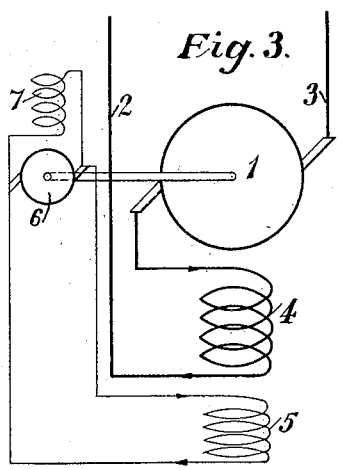
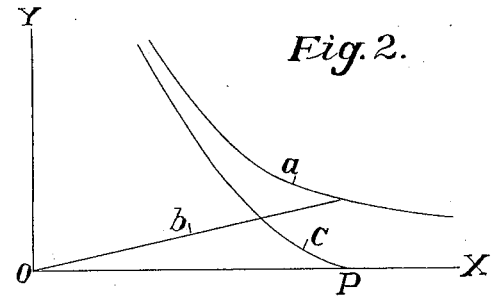
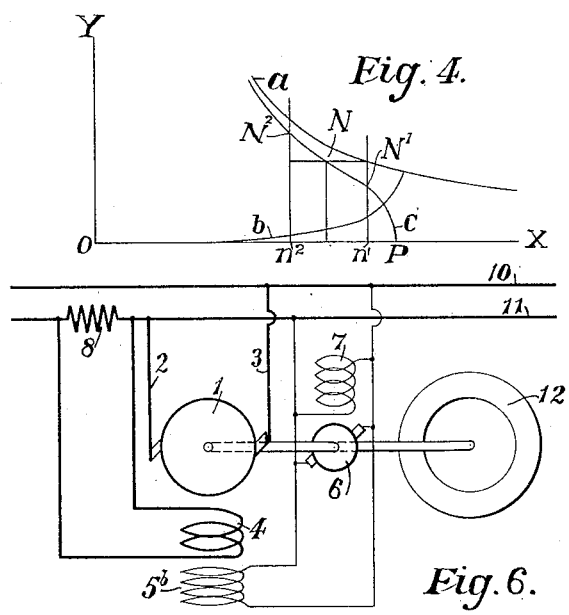
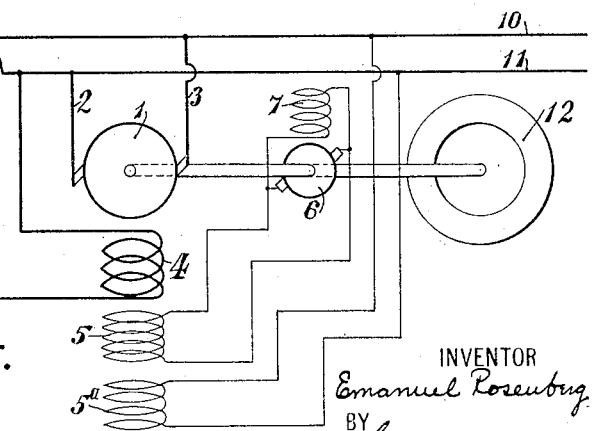
WITNESSES:
INVENTOR
Emanuel Rosenberg
BY
ATTORNEY

UNITED STATES PATENT OFFICE.

EMANUEL ROSENBERG, OF ALTRINCHAM, ENGLAND, ASSIGNOR TO WESTINGHOUSE ELECTRIC AND MANUFACTURING COMPANY, A CORPORATION OF PENNSYLVANIA.

VARIABLE-SPEED ELECTRIC MOTOR.

1,222,469.　　　　　Specification of Letters Patent.　　Patented Apr. 10, 1917.

Application filed October 9, 1911. Serial No. 653,714.

*To all whom it may concern:*

Be it known that I, EMANUEL ROSENBERG, a subject of the Emperor of Austria, and a resident of Altrincham, in the county of Chester, England, have invented a new and useful Improvement in Variable-Speed Electric Motors, of which the following is a specification.

My invention relates to direct current motors and more particularly to motors that are adapted to have considerable ranges of speed with comparatively small variations in the amounts of current supplied thereto, the speeds increasing as the supply of current to the motors is reduced and vice versa. Motors of the kind above mentioned, the rotors of which are provided with fly-wheels, are employed in order to effect equalization of the loads on the supply circuits to which the motors are connected, energy being stored in the fly-wheels in the form of kinetic energy when the loads on the supply circuits are low, the energy thus stored being discharged in the form of mechanical energy to assist the motors in driving the loads, or in the form of electrical energy, in which case the motors are driven as generators by the fly-wheels to discharge into the supply circuits when the loads on the latter are high.

In order to render the equalizing action of a fly-wheel employed in the above noted manner as effective as possible, it is evidently desirable that a comparatively small difference in the current supplied to the motor should effect a considerable difference in its speed but, on the other hand, even when the motor is only taking a very small amount of current from the supply circuit, the speed of the motor should not exceed a predetermined limit.

It has previously been proposed to employ a motor of the series type for the purpose noted and to provide a speed governor to be operated by centrifugal action or otherwise in such manner as to open a circuit-breaker and thus disconnect the motor from the supply circuit when its speed reaches a predetermined limit, or, in some cases, the speed governor has been arranged to close the circuit of a shunt field winding of the motor in order to maintain a shunt field excitation which is sufficient to prevent excessive motor speed, even at the smallest series excitation of the motor. Such an arrangement has, however, the disadvantage of causing a sudden change in the excitation of the motor when the shunt field winding becomes operative, a further disadvantage being due to the fact that an electro-mechanical apparatus is necessary for actuating the circuit-breaker for the shunt field winding. A somewhat complicated apparatus is also required to cut out the shunt winding at the proper moment when the speed is at a lower value and the main current has increased.

On the other hand, if a compound wound motor be employed, the shunt field winding of which is sufficient to prevent the motor from attaining an excessive speed, even when very small amounts of current are supplied to the motor, the disadvantage exists that the shunt field winding reduces considerably the influence of the series field excitation at low speeds and, consequently, the efficiency of the equalizing effect on the fly-wheel.

According to the present invention, a compound-wound motor is employed, the shunt field winding of which is excited by current which is varied in accordance with the speed of the motor, so that, at low speeds, the characteristic of the motor resembles very closely that of a series motor and, at high speeds, it resembles that of a shunt motor.

In order that the invention may be clearly understood, it will now be described with reference to the accompanying drawings in which Figure 1 is a diagram illustrating one method of carrying out the invention in practice. Fig. 2 is a diagram of curves relating to the motor shown in Fig. 1. Figs. 3 and 4 are diagrams similar to Figs. 1 and 2, respectively, and illustrating another method of carrying out the invention. Fig. 5 is a diagram illustrating a further modification of the invention, and Fig. 6 is a diagram illustrating another modification.

Referring now to Fig. 1, the armature 1 of the motor is supplied from the leads 2 and 3 with direct current which also passes through the series field magnet winding 4 of the motor. The shunt field magnet winding 5 of the motor is supplied with current from an exciter, the armature 6 of which is mounted on the shaft of the armature 1. The field magnet 7 of the exciter is supplied with current from a source of constant voltage, such as the battery 8. It will be obvious that the current in the shunt field winding 5 of the motor will be approximately proportional to the speed of the motor.

In Fig. 2, three curves are shown, the ordinates measured along the axis OY representing ampere turns and the abscissæ measured along the axis OX representing revolutions per minute. Curve $a$ shows the relationship between the total number of ampere turns on the field magnet of the motor and the speed of the same. If the motor were a simple series motor the ordinates of the curve $a$ would also represent, on another scale, the current taken by the motor in amperes. Curve $b$ represents the ampere turns of the shunt winding 5 at different speeds, and the difference of these two curves, which is shown by the curve $c$, represents the ampere turns of the series field winding 4 for different speeds. It will be observed that the curve "C" cuts the axis OX at the point P, which shows that, even when the current supplied to the motor from the leads 2 and 3 falls to zero, the speed does not rise above that represented by the abscissa OP.

Referring now to Fig. 3, the arrangements are similar to those shown in Fig. 1, but the field magnet winding 7 of the exciter is connected across the terminals of the armature 6 in place of being energized from a source of constant voltage, that is to say, the exciter is an ordinary shunt wound machine. In this case, the shunt field excitation of the motor will increase or decrease at a much greater rate than the speed, so long as the field of the exciter is magnetically unsaturated. The shunt field excitation of the motor thus increases very rapidly as the motor reaches its maximum speed but will be extremely small throughout the greater part of the range of speed until a value is reached which is near the permissible limit. These conditions are illustrated in the curves shown in Fig. 4, which are somewhat similar to those of Fig. 2. In this case, however, the curve $b$, which shows the relationship between the ampere turns of the field magnet winding 5 and the speed of the motor, turns up rapidly at the end. It will be noted that the curve $c$ is very similar to the curve $a$ at low speeds but, when the speed rises to near the desired limit, it suddenly turns down and cuts the axis of abscissæ at the point P. This shows that the speed of the motor will vary very rapidly with the current supplied from the leads 2 and 3 when this is low.

As will be readily understood, the arrangement above described may be modified by providing the motor, in addition to the variable shunt excitation, with a third field winding and supplying it with current from a source of approximately constant voltage, such, for instance, as the supply circuit itself, the effect of this additional field winding being to provide a shunt field excitation for the motor which exists at all speeds. The field winding $5^a$, Fig. 5, is arranged to be excited in the manner just described.

My invention is practically applicable, as stated above, to load equalizing arrangements in which a fly-wheel is employed, and Fig. 5 is a diagram illustrating a motor having its shunt field winding excited as shown in Fig. 2 and employed for this purpose. A further modification is also illustrated in that the series field winding 4 is connected across a resistance 8 which carries the current from the generating station, represented in the diagram by the generator 9, and a third field winding $5^a$ is connected across the generator circuit. The main current is supplied through mains 10 and 11 to a variable load such as motors for operating hoists. A fly-wheel 12 is mounted on the shaft of the armature 1 and exciter armature 6. The curves shown in Fig. 4 will represent the characteristics of the motor, the curve $c$ showing the relationship between the current in the field winding 4 and the speed of the motor, which is of course the speed of the fly-wheel and, on a different scale, represents the current supplied from the generating station. If it is assumed that the speed of the fly-wheel is desired to vary between the speeds $n^1$ and $n^2$, Fig. 4, the variation in current supplied by the generating station will be represented by the ordinates $n^1$, $N^1$, $n^2$, $N^2$. The current in fact does not vary very greatly from the average current which is given by the value of the ordinate at the point N. The armature 1 will obviously take sufficient current from the mains 10 and 11 when the line voltage exceeds that of the armature, to bring the armature up to the corresponding speed or deliver sufficient current thereto to supply the difference between a momentary demand on the hoist motor and the current supplied by the generating station when the line voltage falls below that of the armature.

In Fig. 6 is illustrated a system that differs from that shown in Fig. 5 only in utilizing a single coil $5^b$ in place of the coils 5 and $5^a$ and supplying energizing currents to this coil from the line conductors 10 and 11 and the exciter 6 connected in parallel relation, it being understood that the circuit 10—11 represents any source of approximately constant voltage.

The invention may be utilized in connection with motors for operating rolling mills or for other cases in which the motor loads are very variable and, as will be seen from an inspection of the curve $c$ in Fig. 4, it may be utilized to obtain a considerable reduction in motor speeds when an increase in the current supplied thereto occurs. In all of the forms of the invention, the series field winding of the motor may, if desired, be connected in the supply circuit or across the terminals of a resistance in the supply circuit, as illustrated in Fig. 5, instead of being connected in series with the motor armature.

The exciter armature may be connected to the motor by any suitable gearing in place of being mounted upon the same shaft.

I claim as my invention:

1. The combination with a compound wound direct current motor, of an exciter for one of the windings of said motor, the speed of which varies with that of the motor and which is itself excited by current from a winding connected as a shunt to its armature.

2. The combination with a direct current motor having a series field magnet winding, a winding supplied with current from a source of constant voltage, and a third winding of an exciter for said third winding the speed of which varies with that of the motor and which is itself excited by current from a winding connected as a shunt to its armature.

3. The combination with a direct current motor having a plurality of field magnet windings, one of which is in series relation to its armature, of an exciter for another of said field magnet windings, the speed of which varies with that of the motor and which is itself excited by current from a winding connected as a shunt to its armature.

4. The combination with a direct current motor having a plurality of field magnet windings, one of which is in series relation to its armature, of an exciter for another of said windings having a field winding connected as a shunt to its armature and operating at speeds corresponding to the speeds of the motor.

5. The combination with a compound wound electric motor, of an exciter for one of the field windings of the motor that has a field winding connected as a shunt to its armature and the speed of which varies with that of the motor.

6. The combination with a direct current motor having a series field winding, a winding supplied with current from a source of constant voltage and a third winding arranged to aid said series field winding, of an exciter for said third winding, the speed of which varies with that of the motor and which is itself excited by current from a winding connected as a shunt to its armature.

In testimony whereof, I have hereunto subscribed my name this nineteenth day of September, 1911.

EMANUEL ROSENBERG.

Witnesses:
NORMAN H. SHEARD,
JAS. STEWART BROADFOOT.

Copies of this patent may be obtained for five cents each, by addressing the "Commissioner of Patents, Washington, D. C."